United States Patent [19]
Palladino et al.

[11] 3,983,308
[45] Sept. 28, 1976

[54] PROCESS FOR MAKING DEGRADABLE POLYMERS AND DEGRADABLE POLYMERS OBTAINED THEREBY

[75] Inventors: Nicola Palladino, Monterotondo; Marcello Mazzei, Milan; Walter Marconi, San Donato Milanese, all of Italy

[73] Assignee: Snam Progetti S.p.A., San Donato Milanese, Italy

[22] Filed: Oct. 24, 1974

[21] Appl. No.: 517,754

[30] Foreign Application Priority Data
Oct. 24, 1974 Italy.................................. 30484/74

[52] U.S. Cl............................ 526/1; 260/DIG. 43; 526/914
[51] Int. Cl.²........................................ C08F 110/02
[58] Field of Search............. 260/33.6 PQ, DIG. 43, 260/94.9 GC; 526/1

[56] References Cited
UNITED STATES PATENTS

| | | |
|---|---|---|
| 3,320,695 | 5/1967 | Moore, Jr. .................... 260/DIG. 43 |
| 3,529,944 | 9/1970 | Leas........................................ 44/70 |
| 3,533,763 | 10/1970 | Leas.......................................... 44/7 |
| 3,797,690 | 3/1974 | Taylor et al. ................. 260/DIG. 43 |

OTHER PUBLICATIONS
Journal of Applied Polymer Science, vol. 11, pp. 2373–2379 (1967), Fox et al.
Journal of Applied Polymer Science, vol. 19, pp. 15–27 (1975), Cernia et al.

*Primary Examiner*—M. J. Welsh
*Attorney, Agent, or Firm*—Ralph M. Watson

[57] ABSTRACT

A novel process for making polymers degradable by the direct action of sunlight is disclosed. The process is based on the addition to the polymer of a compound having the formula:

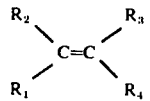

in which $R_1$, $R_2$, $R_3$ and $R_4$ are the same or different and are selected from the group consisting of aromatic radicals with the proviso that one or two of them may be selected from the group consisting of hydrogen, alkyl, cycloalkyl and arylalkyl.

7 Claims, No Drawings

PROCESS FOR MAKING DEGRADABLE POLYMERS AND DEGRADABLE POLYMERS OBTAINED THEREBY

The present invention relates to a process for making the polymers degradable under the direct action of sun light, and also to the degradable polymers obtained thereby.

It is known that the resistance against atmospheric and microbiological agents is, one of the factors which promoted the large propagation of the plastic materials particularly in the packaging industry. This has caused the problem of waste accumulation in the natural environment.

In order to avoid such a drawback many solutions have been proposed such as, for instance, the use of inherently unstable polymers or of additives which let conventional polymers undergo a photodegradation reaction that is initiated by the ultraviolet radiation of the sun spectrum.

However the additives till now employed have the drawback of self-lag phenomena and, moreover undergo a remarkable decrease of activity when the additive is reacted with alkyl groups or grafted onto the polymer in order to limit the migrative motion thereof.

It has now been found, that it is possible to remove the abovesaid drawbacks by using compounds containing an olefinic unsaturation to obtain polymers having a controlled degradation which, constitute a second object of the present invention.

The inventive process essentially consists in adding to the plastic materials, containing or not the more usual commercial additives such as antioxidants, plastifiers, antistatic agents or some others, a compound containing an ethylenic unsaturation having the following general formula

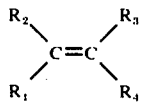

in which $R_1$ $R_2$ $R_3$ and $R_4$ the same or different are aromatic radicals, one or two of them may be also hydrogen or an alkyl, cycloalkyl or arylalkyl radical.

The process is carried out by adding to the starting plastic material the abovesaid unsaturated compound in an amount up to 3%, preferably ranging from 0.01 to 1% by weight.

The addition is performed according to known techniques such as, for instance, powder mixing or milling.

As to the practice of the invention we refer to the following example, reported only for better illustrating the invention without, however, limiting the purposes thereof.

EXAMPLE

A high density commercial polyethylene, containing low amounts of antioxidants, antistatic agents and other usual ingredients, was combined with tetraphenylethylene, according to known methods, in an amount equal to 1% by weight.

The films were obtained by melting in a CARVER press heated at 200°C: samples were obtained having a thickness of about 0.02 cm. Such films were exposed to the radiations of a high intensity Xenon lamp, which had a spectral energy similar to the one of the sun light.

During the exposure of the films the temperature was kept constant at 29° – 32°C.

The degradation rate of the polymer was followed by the variations of the mechanical properties, particularly the percentage elongation at break.

The elongation at break is reported in the following table and is expressed as per cent of the starting value in function of the exposure time as hours.

| | Percentage elongation at break as percent of the starting value after | | | |
|---|---|---|---|---|
| | 0 | 64 h | 120 h | 184 h |
| Polyethylene as such | 100 % | 98 % | 98 % | 80 % |
| Polyethylene added by 1 % tetraphenylethylene | 100 % | 13 % | 12 % | 0 |

What we claim is:

1. Process for making polyethylene degradable by the direct action of the sun light said process consisting of adding to polyethylene an effective amount of a compound containing an ethylenic unsaturation having the formula

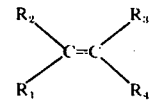

in which $R_1$ $R_2$ $R_3$ and $R_4$ are the same or different and are aromatic radicals, with the proviso that one or two of $R_1$ $R_2$ $R_3$ or $R_4$ may be selected from the group consisting of hydrogen, alkyl, cycloalkyl and arylalkyl.

2. Process according to claim 1 characterized in that the unsaturated compound is added to the polyethylene in an amount up to 3%.

3. Process according to claim 1 characterized in that the unsaturated compound is tetraphenylethylene.

4. Process according to claim 1 characterized in that the unsaturated compound is added to the polyethylene in an amount ranging from 0.01 to 1% by weight.

5. A degradable polymer composition which comprises polyethylene and up to 3% by weight of a compound having ethylenic unsaturation that is of the formula:

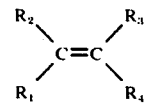

wherein $R_1$ $R_2$ $R_3$ and $R_4$ are the same or different and are aromatic radicals with the proviso that one or two of $R_1$ $R_2$ $R_3$ and $R_4$ may be selected from the group consisting of hydrogen, alkyl, cycloalkyl and arylalkyl.

6. A degradable polymer composition as defined in claim 5 which includes from 0.01 to 1% by weight of the compound having ethylenic unsaturation.

7. A degradable polymer composition as defined in claim 5 characterized in that the unsaturated compound is tetraphenylethylene.

* * * * *